US005171080A

United States Patent [19]

Bathurst

[11] Patent Number: 5,171,080

[45] Date of Patent: Dec. 15, 1992

[54] METHOD OF REDUCING LIGHT LEAKAGE FROM INTERNALLY ILLUMINATED PANELS

[75] Inventor: Anthony H. Bathurst, Tucson, Ariz.

[73] Assignee: Allied-Signal Inc., Morris Township, N.J.

[21] Appl. No.: 706,130

[22] Filed: May 28, 1991

[51] Int. Cl.[5] .............. G01D 11/28

[52] U.S. Cl. .............. 362/23; 362/26; 362/29

[58] Field of Search .............. 362/23, 29, 30, 26; 116/286, 287, 288, DIG. 5, DIG. 6, DIG. 36

[56] References Cited

U.S. PATENT DOCUMENTS

| | | | |
|---|---|---|---|
| 2,280,700 | 4/1942 | Hall . | |
| 2,699,141 | 1/1955 | Gaguski . | |
| 2,763,231 | 9/1956 | Neugass | 362/23 |
| 2,874,268 | 2/1959 | Martin . | |
| 2,957,447 | 10/1960 | Pearce . | |
| 4,044,708 | 8/1977 | Klein | 362/29 |
| 4,163,428 | 8/1979 | Ishikawa | 362/29 |
| 4,321,655 | 3/1982 | Bouvrande | 362/23 |
| 4,625,262 | 11/1986 | Sakakibara et al. | 362/26 |
| 4,807,091 | 2/1989 | Obata | 362/26 |

FOREIGN PATENT DOCUMENTS

| | | | |
|---|---|---|---|
| 594142 | 3/1960 | Canada | 362/26 |

*Primary Examiner*—Ira S. Lazarus
*Attorney, Agent, or Firm*—Hugh P. Gortler; James W. McFarland; Robert A. Walsh

[57] ABSTRACT

An internally illuminated panel is provided with a recess in which a conventional knob of translucent construction is mounted. The recess is covered with an opaque material, except for an area that allows light to be transmitted to the knob. The knob abuts against a boss, which is provided within the recess to prevent the opaque material from being scraped and to facilitate spacing the knob from the panel as it is mounted thereon.

19 Claims, 1 Drawing Sheet

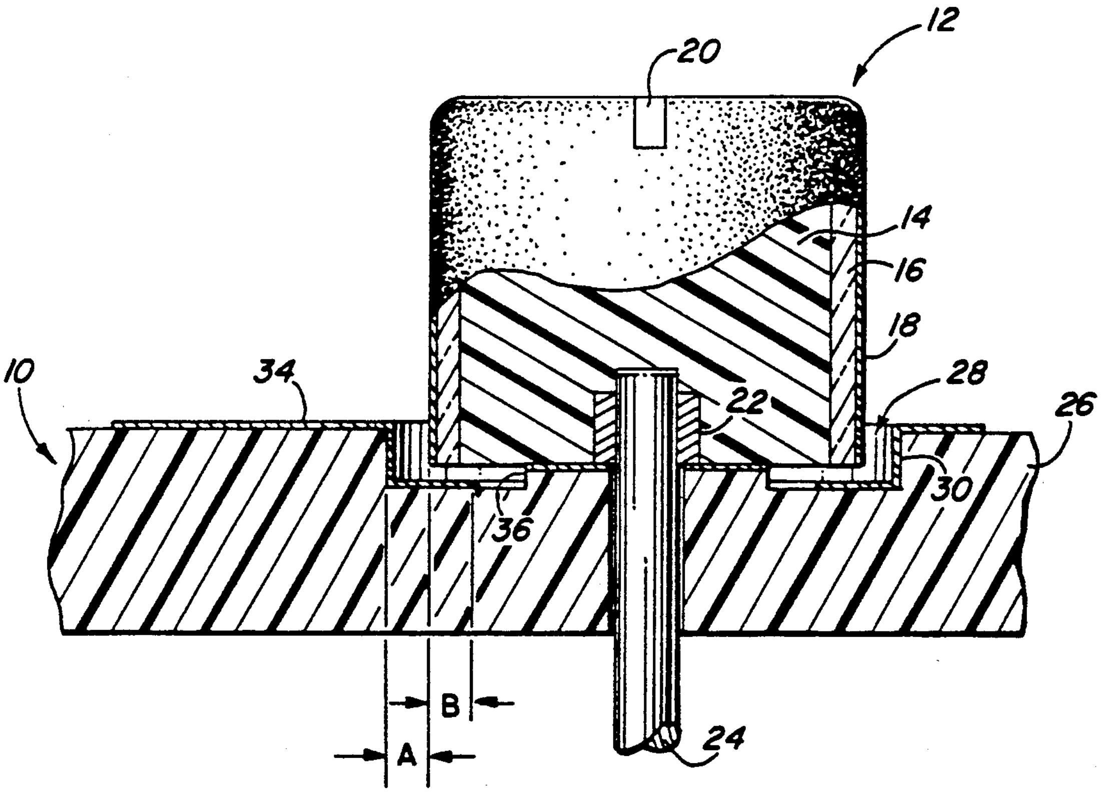
20
12
14
16
18
10
34
28
22
26
30
36
B
A
24

METHOD OF REDUCING LIGHT LEAKAGE FROM INTERNALLY ILLUMINATED PANELS

FIELD OF THE INVENTION

The present invention relates in general to illuminated panels and in particular to a method of reducing light leakage from an internally illuminated panel that employs conventional knobs of translucent construction.

BACKGROUND OF THE INVENTION

In the cockpit of an aircraft and in a control tower of an airport, it is important to have good visibility of the knobs on a control panel. Internally illuminated panels are known to improve the visibility of the knobs, especially in a darkened environment. To further improve the visibility, knobs of translucent construction are employed with these internally illuminated panels.

A conventional knob of translucent construction has a transparent or translucent body made of plastic or acrylic, which is coated with a translucent reflecting material. Coated over the translucent reflecting material is an opaque material. An indicator line is formed on the knob by engraving through the opaque material, thereby exposing the translucent reflecting material. A contrast in colors between the opaque and reflecting materials is desirable, e.g., black for the opaque material and white for the reflecting material. When light is transmitted through the translucent body of the knob, the exposed reflecting material, which forms the pointer, is illuminated. Such a knob is simple and inexpensive to manufacture.

The internally illuminated panel typically includes a flat, light-transmitting core that is coated with an opaque layer. An annular area of the opaque layer is removed, which exposes an underlying area of the light-transmitting core. The exposed annular area is covered by the body of the knob. Light, provided by a source of illumination on the opposite side of the core, is transmitted through the exposed area and into the body of the knob, whereby the pointer on the knob is illuminated. Knobs of translucent construction and internally illuminated panels are well known to those skilled in the art. See, for example, U.S. Pat. No. 2,763,231 issued to Edwin Neugass on Sep. 18, 1956.

A problem associated with internally illuminated panels arises when light leaks from a gap located between the knob of translucent construction and the core of the panel. The leakage causes a bright halo of light around the knob, which is a source of concern and disturbance, especially to flight crews during darkened flying conditions. Not only is the halo a source of nuisance, but it also degrades the appearance and readability of cockpit instruments.

Attempts have been made to reduce such light leakage. In U.S. Pat. No. 2,699,141 issued to Edward Gaguski on Jan. 11, 1955, a bevel is cut into the underside of the core of the internally illuminated panel. The beveled surface is coated with a reflecting material. Light is reflected off the beveled surface and into the body of the knob, whereby the pointer is illuminated. In an alternate embodiment, a bevelled recess is cut into the body of the knob. The bevelled surface is coated with a light-reflective material. The knob has its lower portion inserted into an aperture in the core. Light supplied by the internally illuminated panel is reflected into the upper portion of the body to illuminate the pointer. See also U.S. Pat. No. 4,163,428 issued to Masao Ishikawa on Aug. 7, 1979, in which a source of illumination is disposed within the knob. Although the Ishikawa knob and the alternate embodiment disclosed by Gaguski reduce light leakage, they require specially constructed knobs.

Among other disadvantages associated with internally illuminated panels and its knobs, the underside of the knob must be positioned from the core so as not to rub against the opaque paint. The step of placing a small gap between the knob and the core is time consuming.

Therefore, it is an object of the present invention to reduce light leakage in an internally illuminated panel that employs conventional knobs of translucent construction.

It is another object of the present invention to facilitate the step of mounting the knob onto the internally illuminated panel.

SUMMARY OF TUE INVENTION

Light leakage from an internally illuminated panel is reduced by recessing at least one of its knobs into the panel. A recess, which has at least one wall and a floor, is created in the panel. A corresponding one knob is positioned in the recess with a light-receiving surface of the knob being in communication with the floor of the recess. A film of opaque material is applied to the floor of the recess except for an exposed area beneath the knob. The exposed area allows light to be supplied to the light-receiving surface of the corresponding one knob.

To facilitate positioning the knob within its recess, a boss having a predetermined thickness is coupled the floor of the recess. The boss provides a space between the light-receiving surface of the knob and the panel.

BRIEF DESCRIPTION OF THE DRAWING

The Figure is a cross-sectional view of an internally illuminated panel in accordance with the present invention and an elevational view of a knob of translucent construction. A section of the knob is removed for clarity.

DETAILED DESCRIPTION OF THE PREFERRED EMBODIMENT

The present invention is applicable to an internally illuminated panel. As defined herein, a panel is an internally illuminated type if it employs a light-transmitting core that is selectively covered with an opaque material to allow light to pass to an instrument, such as a knob.

Referring now to the Figure, there is shown an internally illuminated panel 10 in accordance with the present invention and a knob 12 of translucent construction. The knob 12 is a conventional, off-the-shelf type, which has a body 14 made of a transparent or translucent material, such as plastic or acrylic. The body 14 is coated with a layer 16 of translucent paint and a layer 18 of opaque paint. A small area of the opaque paint is etched away or is masked off to form a pointer 20. A bushing 22 is embedded within the lower portion of the body 14.

The internally illuminated panel 10 includes a light-transmitting core 26 that is made of a transparent or translucent material such as plastic or acrylic. The thickness of the core 26 is partly dependent upon whether the panel is supported or unsupported. Generally, the core of an unsupported panel (i.e., a panel that is screwed onto a chassis) is made thicker than the core of a supported panel (i.e., a panel that is placed over another panel) in order to prevent warping. The thickness of the core 26 is also dependant upon the depth of a recess 28, which is milled into the front surface of the core 26. The recess is defined by a wall 30 and a floor 32. To eliminate the halo that would otherwise emanate from the knob 12, the knob 12 is positioned within the recess 28. Thus, the depth and diameter of the recess 28 are dependant upon the dimensions of the knob 12. A clearance A between the knob 12 and the wall 30 of the recess 28 is provided to prevent the knob 12 from rubbing against the wall 30. The amount of clearance does not have to be milled to precision. This has the advantage of allowing knobs of different diameters to be placed within the recess 28. The depth of the recess 28 must be selected such that the lower portion of the body 14 is surrounded by the wall 30. If the recess 28 is made too shallow, it will not contain the light that escapes from the gap between the knob 12 and the core 26. The actual dimensions of the recess can be derived without undue experimentation.

An opaque material such as black paint 34 is applied to the front surface of the core 26 and to the wall 30 of the recess 28. The black paint 34 is also applied to a portion of the floor 32 underneath the knob up to a distance B from the periphery of the knob 12. This leaves an exposed area of the core 26 that allows light to be transmitted to the body 14 and pointer 20. Selection of the distance B (i.e., the actual area of the core 26 to be exposed) is dictated by the following considerations. If the distance B is not made great enough, light will escape from the recess 28. However, if the distance B is made too great, insufficient light will be supplied to the knob 12. A balance of these considerations can be struck without undue experimentation. The black paint 34 is sprayed onto the core 26, with the floor 32 of the recess 28 being masked to obtain the proper exposed area. Alternately, the entire floor 32 can be painted, with the paint 34 being etched away to form the exposed area.

A boss 36 is formed from the floor 32 of the recess 28 and, therefore, is made from the light-transmitting material of the core 26. The boss 36 surrounds a switch shaft 24, onto which the knob 12 is mounted. The bushing 22 of the knob 12 receives the switch shaft 24. The knob 12 is pushed onto the switch shaft 24 until the bushing 22 abuts against the boss 36. A mounting screw(s) (not shown) fastens the knob 12 to the switch shaft 24. Although the knob 12 rides the upper surface of the boss 36, the friction is low because the diameter of the bushing 22 is far less than that of the boss 36. Thus, the knob 12 is separated from the core 26 by a distance equal to the height of the boss 36. The dimensions of the recess 28 are dependant upon the size of the knob 12. The boss 36 must be totally contained within the recess 28; otherwise, light will escape from the recess 28. Typically, the height of the boss 36 is one-third the depth of the recess 28. By separating the knob 12 from the core 26, the boss 36 performs two functions. First, it prevents the knob 12 from scraping the paint 34 off the floor 32. Second, the boss 36 spaces the knob 12 from the floor 32 by a predetermined distance, thereby eliminating an independent assembly step of spacing the knob 12 from the floor 32. The panel 10 may be molded in one operation creating all holes and recesses.

The present invention is now described in connection with a MIL-SPEC knob, which has a height of 0.750 inches and a diameter of 1.10 inches at its base. For a knob 12 of these dimensions, the clearance A is 0.013 inches; therefore, the diameter of the recess 28 is 1.230 inches. The depth of the recess 28 is 0.030 inches; and, the height of the boss 36 is 0.010 inches. The paint 34 is a distance B of 0.150 inches from the periphery of the knob 12; therefore, the resulting exposed area is 0.950 square inches. The thickness of the paint 34 is approximately two mils.

During operation of the internally illuminated panel 10, light passes through the core 26 and into the body 14 of the knob 12. Any light that escapes from the space between the knob 12 and the core 26 is contained within the recess 28. As a result, the distracting halo effect is eliminated.

It will be understood that the embodiment described herein is merely exemplary and that a person skilled in the art may make many variations and modifications without departing from the spirit and scope of the invention. All such modifications are intended to be included within the scope of the invention as defined in the appended claims.

I claim:

1. A method of reducing light leakage from an internally illuminated panel that supplies light to at least one knob having a light-receiving surface, comprising the steps of:

(a) creating at least one recess in the panel, each recess having at least one wall and a floor;

(b) positioning a corresponding one knob in the recess with the light-receiving surface of the knob being in communication with the floor of the recess; and (c) applying a film of opaque material to the floor of each recess except for an exposed area underneath the corresponding knob that allows light to be supplied to the light-receiving surface of the corresponding one knob.

2. A method according to claim 1, wherein said step of applying a film further includes the step of applying the opaque material to at least one wall of each recess.

3. A method according to claim 1, wherein said step of creating at least one recess further includes the step of providing clearance between at least one wall of the recess and its corresponding one knob.

4. A method according to claim 1, wherein the panel is milled to create each recess.

5. A method according to claim 1, wherein the opaque material is paint and wherein said step of applying the opaque material includes the steps of spraying the paint onto the floor and etching away a portion of the opaque material to form the exposed area.

6. A method according to claim 1, wherein the opaque material is paint and wherein said step of applying the opaque material includes the steps of masking the exposed area, and spraying the paint onto the floor.

7. A method according to claim 1, further including the step of providing spacing means on the floor of each recess, and wherein said step of positioning includes abutting the light-receiving surface of the knob against the spacing means, said spacing means functioning to provide a space between the floor and the light-receiving surface of the knob.

8. A method according to claim 7, wherein the space is no greater than half the depth of the recess.

9. A method according to claim 8 wherein said spacing means is a boss and wherein the boss is molded into the panel.

10. A method according to claim 8, wherein said spacing means is a boss, and wherein the boss is milled from each floor of the recess.

11. A method according to claim 1, wherein each recess is molded into the panel.

12. Apparatus for supplying light to at least one knob having a light-receiving surface, comprising a light-transmitting core having at least one recess within said core, each said recess having at least one wall and a floor, at least one knob being positioned within a corresponding one recess with the light-receiving surface of said one knob being in communication with said floor of said corresponding one recess; and a film of opaque material which covers said floor of said corresponding one recess except for an exposed area beneath said one knob that allows light to be supplied to said light-receiving surface of said one knob.

13. Apparatus according to claim 12, wherein said at least one wall of said corresponding one recess is covered with said opaque material.

14. Apparatus according to claim 13, wherein said opaque material is a non-reflecting paint.

15. Apparatus according to claim 12, wherein there is clearance between said one knob and at least one wall of said corresponding one recess.

16. Apparatus according to claim 12, further comprising spacing means, coupled to said floor of said corresponding one recess, for providing a space between said light-receiving surface of said one knob and said floor of said corresponding one recess, said light-transmitting surface of said one knob being abutted against said spacing means.

17. Apparatus according to claim 16, wherein said space is no greater than half the depth of said corresponding one recess.

18. Apparatus according to claim 17, wherein said spacing means is a boss.

19. Apparatus according to claim 18, wherein said boss is affixed to said floor of said recess.

* * * * *